H. NELSON.
ENLARGED SPINDLE AND WHEEL HUB.
APPLICATION FILED FEB. 8, 1916.

1,229,311.

Patented June 12, 1917.

WITNESSES:
Robt. H. Pearson
Percy O'Connor

INVENTOR.
Hilmer Nelson.
BY F. C. Bates
ATTORNEY.

UNITED STATES PATENT OFFICE.

HILMER NELSON, OF SAN JOSE, CALIFORNIA.

ENLARGED SPINDLE AND WHEEL-HUB.

1,229,311.  Specification of Letters Patent.  Patented June 12, 1917.

Application filed February 8, 1916. Serial No. 76,993.

*To all whom it may concern:*

Be it known that I, HILMER NELSON, a citizen of the United States, residing at San Jose, in the county of Santa Clara and State of California, have invented certain new and useful Improvements in Enlarged Spindles and Wheel-Hubs, of which the following is a specification.

This invention relates to new and useful improvements in enlarged spindle and wheel hub, and more particularly to a metallic enlarged wheel hub and spindle having reinforcing elements, to prevent the same from breaking under the weight of a heavy load.

An object of the invention is to provide a metallic enlarged spindle and wheel hub for the above purpose and to reinforce the same by novel means to be hereinafter more fully described, which will absolutely prevent breaking, and will also require less pulling power for a heavy load, and will render the travel of said wheel practically noiseless.

Finally, an important object of my invention is to provide a wheel hub and spindle of the character-described which will be strong, durable, simple and efficient and comparatively inexpensive to construct, and also one which will not be likely to get out of working order.

With these and various other objects in view, my invention has relation to certain novel features of construction and operation, an example of which is described in the following specification, and illustrated in the accompanying drawings, wherein.

Referring now more particularly to the drawings, wherein like reference characters designate similar parts throughout the several figures.

Figure 1:
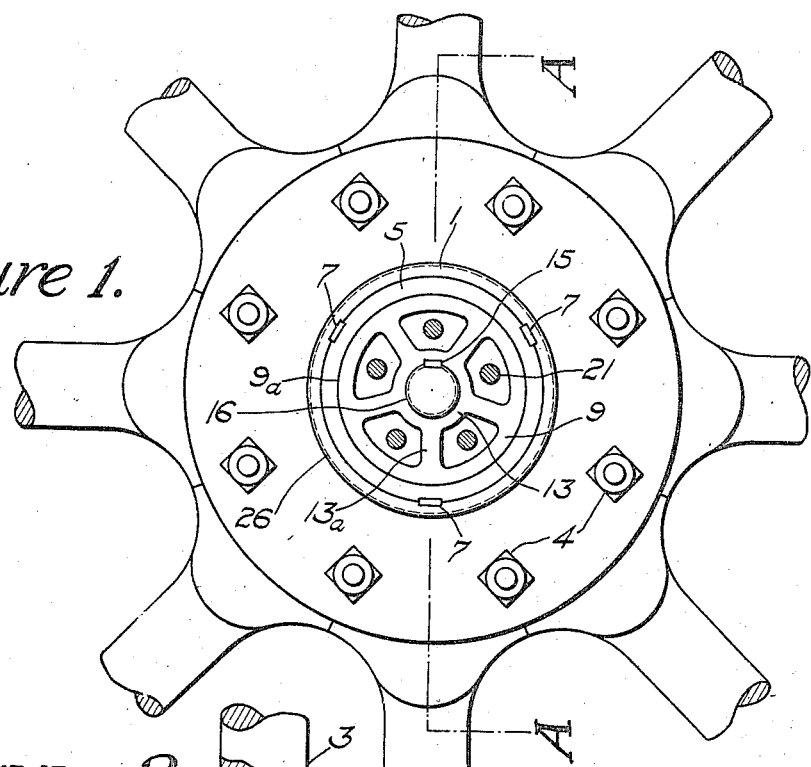
Figure 1 is an out-side elevation of a wheel with my enlarged wheel hub and spindle attached with outer dust cap, outer washer, and spindle nut removed.
Figure 2:
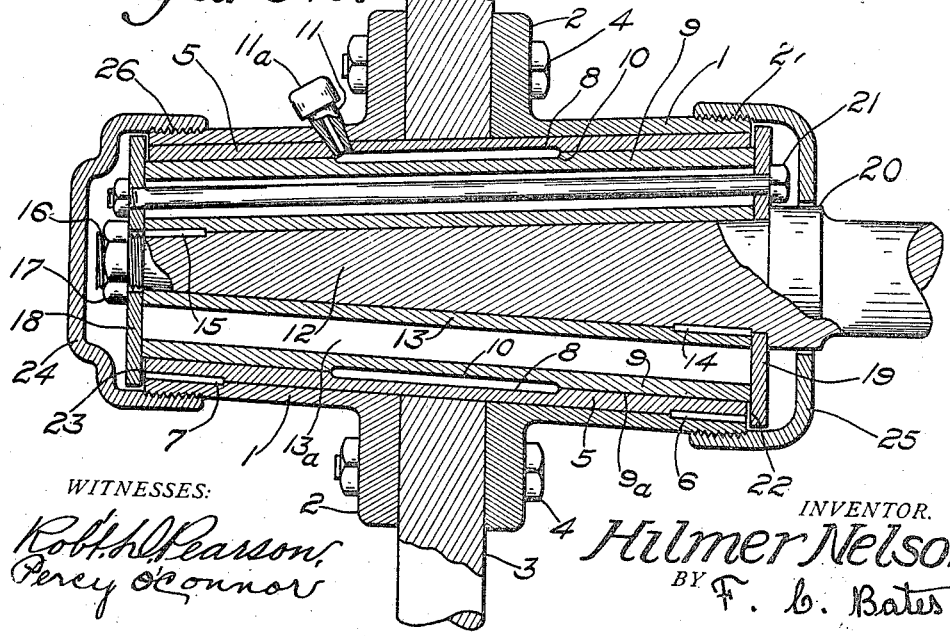
Fig. 2 is a sectional view on line A—A of Fig. 1, showing my enlarged wheel hub and spindle completely assembled, with spokes and axle parts broken away.

1 designates the outer casing of my wheel hub, the same being made of metal in two parts, each part having a flange as 2, between said flanges 2 are placed spokes 3, when casing 1, and spokes 3 are bolted together by bolts 4, passing through flanges 2 and spokes 3. Axle-box 5 is inserted in casing 1 and keyed therein by keys 6—7, said axle-box 5 having a cavity at the center thereof as shown at 8 adapted to carry a lubricant therein for the purpose of lubricating the hub bearing $9^a$ between outer extension tube 5 and spindle extension tube 9, tube 9 having a cavity 10 near the center thereof, adapted to carry a lubricant in connection with cavity 8 of tube 5. Oil tube is shown at 11, the same having a cap $11^a$ for the purpose of excluding dirt therefrom, said cap $11^a$ may be removed, and a lubricant injected through tube 11 to cavity 8—10, for the purpose of lubricating the bearing $9^a$ of said wheel hub and spindle, without removing said wheel hub, from said spindle.

Axle spindle is shown at 12, the same being keyed to axle-skein 13 by keys 14—15, said axle-skein 13 being an integral part of axle-skein 9 having a plurality of enlarged webs $13^a$ cast therewith, said webs $13^a$ run longitudinally through between tube 9 and axle-skein 13, and are adapted to extend the spindle bearing to connect with enlarged hub bearing $9^a$, the outer end of said spindle 12 being threaded at 16 to receive a nut 17, the same being adapted to hold washer 18 against the ends of tubes 9—13, and key 15. At the inner end of said hub is washer 19, said washer bearing against collar 20, which is an integral part of spindle 12, and against the inner ends of tube 9—13 and key 14, said washers are drawn rigidly against tubes 9—13 by bolts 21. Between the inner end of casing 1 and axle-box 5, and washer 19 is a bearing clearance 22, and between outer end of said casing 1 and axle-box 5, and washer 18, is a bearing clearance 23. Dust caps 24—25 are shown threaded at 26—27 to outer casing 1 at the outer and inner ends of said hub and spindle to protect said bearings from dirt.

I do not wish to confine myself as to size of my enlarged spindle and wheel hub, as the same may be made of any size suitable to the wheel, which the same is to be used with.

Having thus described my invention, what I claim as new, and desire to secure by Letters Patent, is:—

1. In an enlarged spindle and wheel hub the combination of an outer casing made of metal in two parts, each part having a flange, said flanges being adapted to fasten spokes therebetween, an enlarged axle-box, means by which the same is fastened to the inside of said outer casing, an axle spindle extension tube comprising the axle skein and the outer axle skein, means by which said axle spindle is fastened to said axle skein which is an integral part of said axle spindle extension tube connected thereto by a plurality of webs cast longitudinally between said axle skein and said outer axle skein, adapted to form a bearing for said hub, as and for the purpose described.

2. In an enlarged spindle and wheel hub the combination of an outer casing made of metal in two parts, each part having a flange, said flanges being adapted to fasten spokes therebetween, an axle spindle extension tube, comprising the axle skein, and the outer axle skein, means by which an axle spindle is fastened thereto, a plurality of webs cast longitudinally between said axle skein and said outer axle skein, adapted to form an enlarged outer axle skein, washers at the ends of said axle skeins, means by which said washers are drawn rigidly against the ends of said axle skeins, means by which said outer axle skein is lubricated, as and for the purpose described.

In testimony whereof, I affix my signature in the presence of two witnesses, this 2 day of Feb., 1916.

HILMER NELSON

Witnesses:
R. D. PEARSON,
C. CLIFFORD.